(No Model.) 3 Sheets—Sheet 1.
N. H. CONE.
APPARATUS FOR TREATING ORES.
No. 532,263. Patented Jan. 8, 1895.
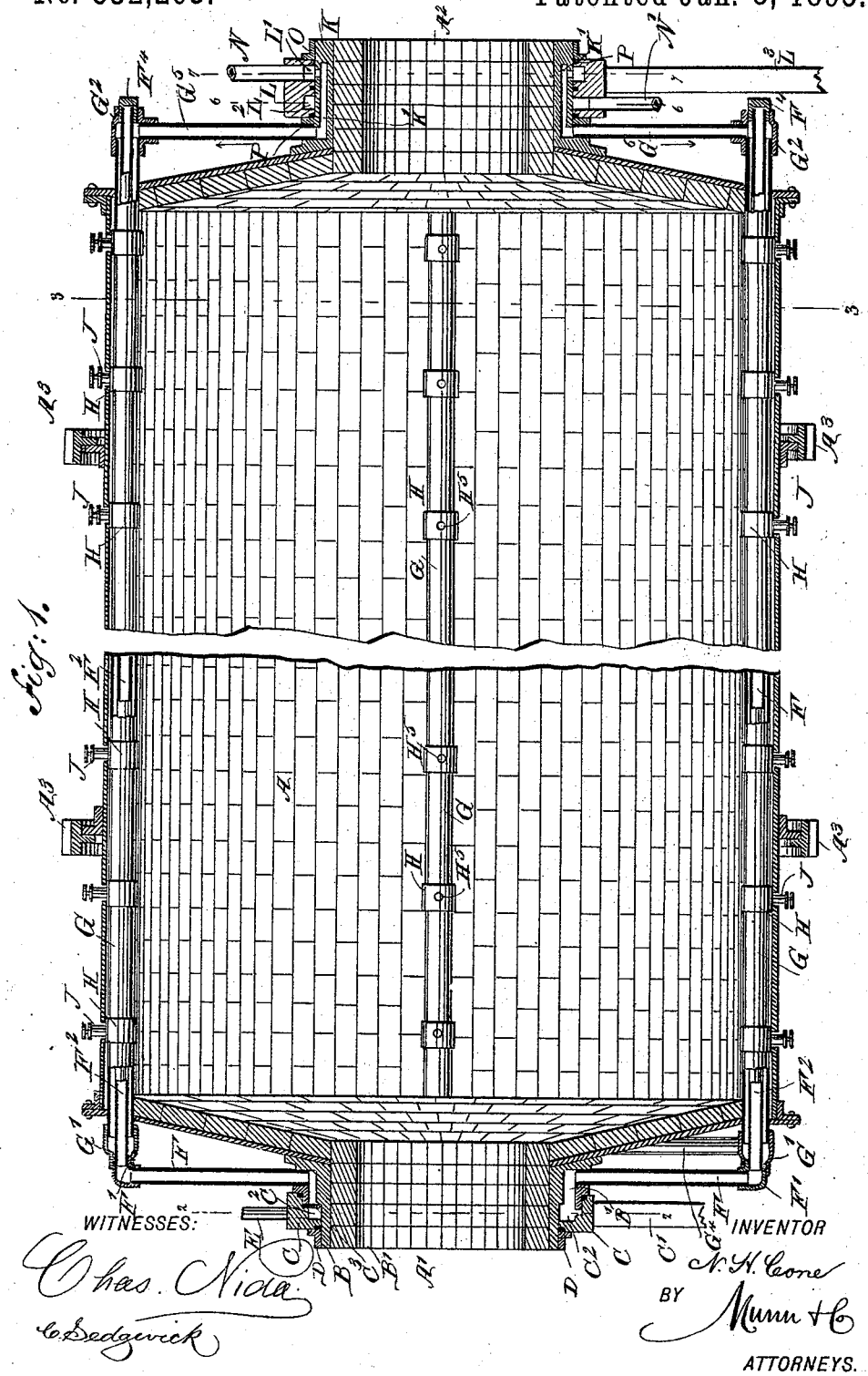

(No Model.) 3 Sheets—Sheet 2.
N. H. CONE.
APPARATUS FOR TREATING ORES.
No. 532,263. Patented Jan. 8, 1895.
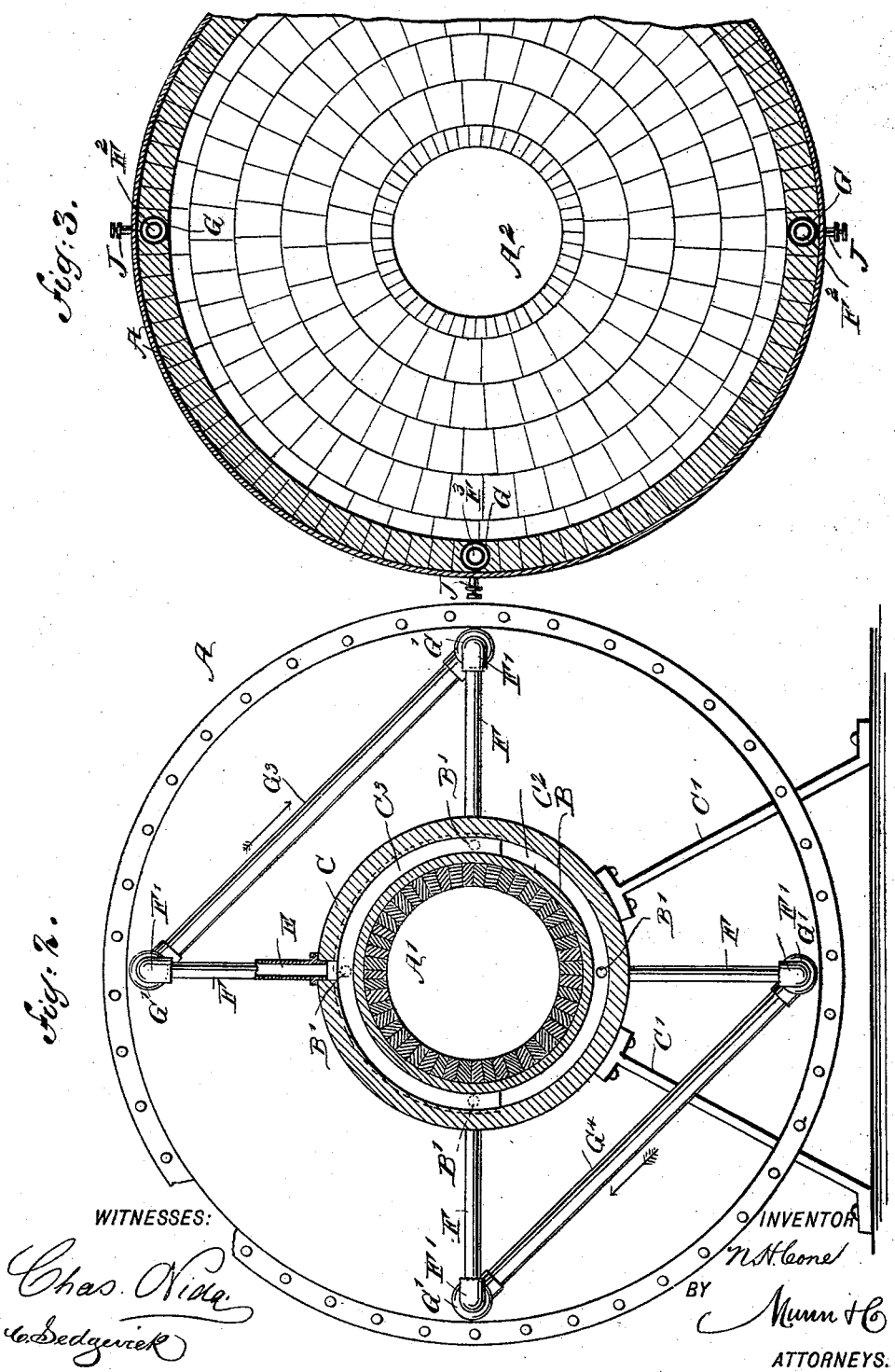

(No Model.) 3 Sheets—Sheet 3.
N. H. CONE.
APPARATUS FOR TREATING ORES.

No. 532,263. Patented Jan. 8, 1895.

WITNESSES:
Chas. Niola
C. Sedgwick

INVENTOR
N. H. Cone
BY
Munn & Co
ATTORNEYS.

UNITED STATES PATENT OFFICE.

NORRIS H. CONE, OF LEADVILLE, COLORADO.

APPARATUS FOR TREATING ORES.

SPECIFICATION forming part of Letters Patent No. 532,263, dated January 8, 1895.

Application filed February 24, 1894. Serial No. 501,390. (No model.)

*To all whom it may concern:*

Be it known that I, NORRIS H. CONE, of Leadville, in the county of Lake and State of Colorado, have invented a new and Improved Apparatus for Treating Ores, of which the following is a full, clear, and exact description.

The invention relates to revolving ore roasting furnaces, and its object is to provide a new and improved apparatus, which is comparatively simple and durable in construction, very effective in operation and more especially designed for roasting and chloridizing gold, silver, copper and other ores and for other purposes.

The invention consists in the novel features of construction and peculiar combinations of the same, as will hereinafter be first described in detail and then specifically pointed out in the appended claims.

Reference is to be had to the accompanying drawings, forming a part of this specification, in which similar letters of reference indicate corresponding parts in all the figures.

Figure 4:
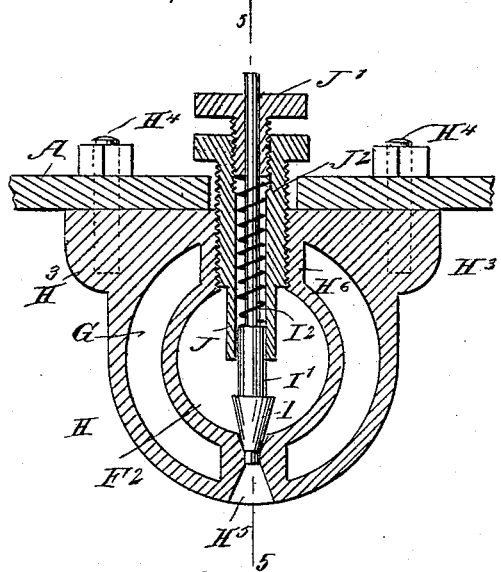
Figure 5:
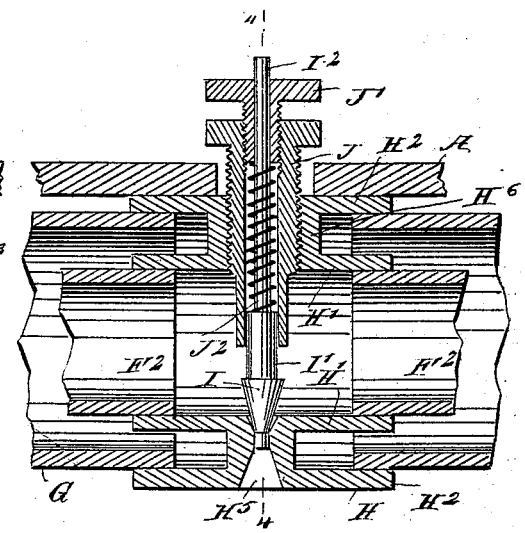
Figure 6:
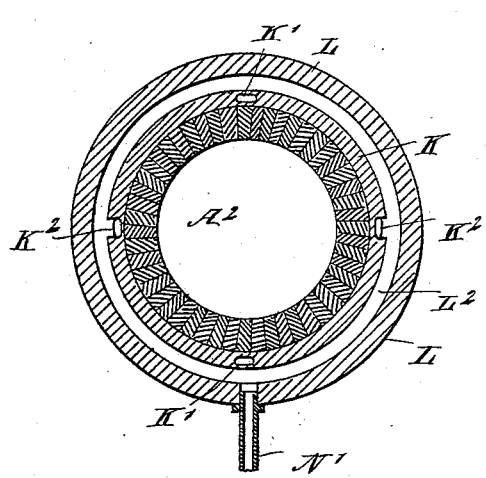
Figure 7:
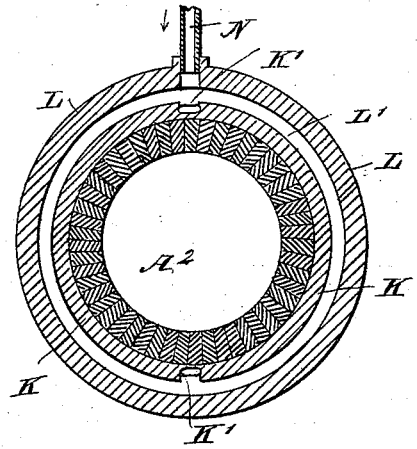

Figure 1 is a sectional side elevation of the improvement. Fig. 2 is a transverse section of the same on the line 2—2 of Fig. 1. Fig. 3 is a similar view of the same on the line 3—3 of Fig. 1. Fig. 4 is an enlarged cross section of one of the air supply pipes, and a valve contained therein, the section being taken on the line 4—4 of Fig. 5. Fig. 5 is a sectional side elevation of the same on the line 5—5 of Fig. 4. Fig. 6 is a transverse section of the improvement on the line 6—6 of Fig. 1; and Fig. 7 is a similar view of the same on the line 7—7 of Fig. 1.

The improved apparatus is provided with a roasting cylinder A, made of sheet metal, such as boiler plate, and lined interiorly with fire-brick or other suitable material. The cylinder A is provided at its ends with the usual contracted necks $A'$ and $A^2$, through which the material to be treated in the cylinder is introduced, also the heat necessary to heat the material to be roasted in the cylinder. The latter is mounted to revolve in the usual manner and is provided on its periphery with gear wheels $A^3$ in mesh with a suitable driving gear mechanism of any approved construction.

On the contracted neck $A'$ of the cylinder A is secured a ring B on which is mounted a ring C provided with arms $C'$ secured to a fixed support, so that the said ring C is held stationary, while the cylinder A revolves, and the ring B revolves within the ring C. The ring C is held in place on the ring B, by a suitable collar D fastened on the said ring B, as plainly shown in Fig. 1, and the ring is formed with an interior recess $C^2$ forming with the ring B a chamber into which passes the air, gas or other fluid to be forced into the cylinder A and into the ore contained therein, as hereinafter more fully described.

Now, in order to charge the chamber $C^2$ with air, gas or other fluid, I provide a supply pipe E opening into the chamber $C^2$ and connected with a suitable source of air supply, gas supply, or other fluid supply for forcing the air, gas or fluid under pressure into the said chamber. This chamber $C^2$ is adapted to connect with a series of ports $B'$ formed longitudinally in the ring B, and each port is connected with a branch pipe F extending radially from the ring B, to connect at its outer end by an elbow $F'$ with a longitudinally-extending pipe $F^2$, preferably made in sections and contained within a jacket G, which for protection is fitted in a groove formed in the lining of the cylinder, its inner edge being however exposed as most clearly shown in Fig. 3 of the drawings.

In order to prevent the air, gas or other fluid from passing simultaneously into all the ports $B'$ and the pipes F and $F^2$, I provide a cut-off plate $C^3$ made in the shape of a segment of a circle, as plainly indicated in Fig. 2, and fitted onto the ring C on the inner side of the recess forming the chamber $C^2$. This plate C is so arranged on the upper half of the ring C that it covers or cuts off the three uppermost ports $B'$ from the chamber $C^2$, while the lowermost port $B'$ opens into the chamber, and consequently the air, gas or other fluids contained in the chamber can pass through this lowermost port $B'$ into that pipe F extending downwardly, so that the air, gas or other fluid passes into the lowermost longitudinally-extending pipe $F^2$ to discharge the air, gas or other fluid into the ore contained in the bottom of the cylinder A.

As shown in Fig. 1, the longitudinal pipes $F^2$ extend through the ends or heads of the cylinder A, and the right hand ends of the said pipes $F^2$ are closed by a suitable plug $F^4$. The jacket pipe G for each pipe $F^2$ is connected at its left outer end with a T $G'$ secured on the elbow $F'$, and a similar T $G^2$ is arranged on the right hand end of the jacket pipe G to carry the plug $F^4$, as plainly illustrated in Fig. 1. The individual sections of each pipe $F^2$ and its jacket pipe G have their ends secured in annular flanges $H'$ and $H^2$ of a casting H, plainly shown in Figs. 4 and 5, and provided with offsets $H^3$ fastened by studs $H^4$ to a boiler plate or other metal sheet forming the shell for the cylinder A.

In the bottom or inner end of each casting H is arranged a port $H^5$ which connects the interior of the said casting H leading to the pipe $F^2$ with the interior of the cylinder A, so that the air passing through the said pipe $F^2$ can pass through the said port or opening $H^5$ into the interior of the cylinder, it being understood that this discharge of air, gas or other fluid takes place at the time the pipe $F^2$ is at its lowermost point and is not cut off by the plate $C^3$ from the chamber $C^2$. Each port $H^5$ is held normally closed by a valve I preferably conical in shape and provided with a stem $I'$ having a reduced portion $I^2$, as plainly shown in Figs. 4 and 5.

The stem $I'$ is fitted to slide in a bearing J screwing in a boss $H^6$ formed in the casting H directly opposite the port $H^5$, and in this bearing J screws a nut $J'$ forming a bearing for the reduced end $I^2$ of the stem $I'$ for the valve I. A spring $J^2$ is coiled on the reduced part $I^2$ of the stem $I'$ and is contained within the bearing J, the said spring resting with its lower end against the top of the stem $I'$ and with its outer end abuts against the nut $J'$. Now, it will be seen that by adjusting the nut $J'$ by screwing the same inward or outward in the bearing J, the tension of the spring $J^2$ is regulated so as to hold the valve I with more or less force onto its seat to close the port $H^5$. Now it will be seen that the air, gas or fluid under pressure passing through the pipe $F^2$ into the casting H, acts on the valve I, so that when the pressure of the gas, air or fluid becomes greater than the tension of the spring $J^2$, then the said valve I will slide outward in its bearing J so as to open the port $H^5$ to permit the air to escape through the said port $H^5$ into the interior of the cylinder A. When the pressure of the air, gas or other fluid in the pipe $F^2$ becomes reduced then the spring $J^2$ presses the valve I inwardly to seat it on the inner end of the port $H^5$, so as to close the same.

In order to prevent the heat in the cylinder A from affecting the pipes $F^2$, I inclose the latter in the jacket pipes G, as previously described, and circulate through the space around the said pipes, water or other cooling medium, so as to keep the pipes at a comparatively low temperature, and consequently prevent their destruction by the heat of the cylinder A.

In order to circulate the water through the water jacket pipes G, the following device is provided: The T $G'$ of the uppermost jacket pipe G at the left hand end of the cylinder A is connected by a diagonal branch pipe $G^3$ with the T $G'$ of the jacket pipe G in the right hand side of the cylinder A, as plainly shown in Fig. 2, and the lowermost T $G'$ of the lowermost jacket pipe G is connected at this end of the cylinder A by a diagonal branch pipe $G^4$ with the T $G'$ of the jacket pipe G in the left hand side of the cylinder A.

The T's $G^2$ of the upper and lowermost jacket pipes G at the right hand end of the cylinder A are connected by radial branch pipes $G^5$ and $G^6$ with ports $K'$ formed in a ring K secured to the contracted neck $A^2$ of the cylinder A. The ports $K'$ located diametrically opposite each other open into an annular space or recess $L'$ formed in a ring L supported on suitable arms or rods $L^3$ secured to a fixed support in the same manner as the legs $C'$ carrying the ring C. The T's $G^2$ of the jacket pipes G in the sides of the cylinder A are connected with ports $K^2$ likewise formed in the ring K diametrically opposite each other, as plainly indicated in Figs. 4 and 5, the said ports opening into an annular recess or chamber $L^2$ likewise formed in the fixed ring L, as plainly shown in Figs. 1 and 6. Now, into the recess or chamber $L'$ leads a pipe N connected with a water supply and from the bottom of the chamber $L^2$ leads a discharge pipe $N'$ to carry off the water after it has circulated through the several jacket pipes in the manner presently to be described.

In order to hold the ring N in place on the ring K, I provide a collar O, and to prevent leakage of water between the rings L and K, I provide the former with suitable packing rings P, as plainly indicated in Fig. 1. Now, it will be seen that the water passing through the supply pipe N passes into the annular chamber $L'$ and from the latter into the ports $K'$, to pass through the branch pipes $G^5$ and $G^6$ into the top and bottom jacket pipes G and to pass along the said jacket pipes from the right to the left, to cool the top and bottom air pipes $F^2$, to finally pass from the T's $G'$ into and through the diagonal branch pipes $G^3$, $G^4$, to the jacket pipes in the sides of the cylinder A and along the same from the left to the right to cool the air pipes $F^2$ therein. The water finally passes from the right hand ends of the said side jacket pipes G to the ports $K^2$, and from the latter into the annular recess $L^2$, to be discharged therefrom through the outlet pipe $N'$. Thus, a complete circulation of water is had in all the jacket pipes G to cool the air pipes $F^2$ to their ends and thus save the same from a rapid destruction.

It is understood that the material in the cylinder A may be in solid, liquid or gaseous form, and the air, gas or other fluid introduced into the said cylinder through the pipes $F^2$ serves to produce a change in the material under treatment, which change may be of a chemical nature, as in roasting ores for instance, or of a mechanical nature, as for instance, forcing cold air, gases or other fluids through the ore after the latter is roasted, to cool it down to a less temperature. It will also be seen that hot gases or hot liquids may be introduced through the said pipes $F^2$ into the interior of the cylinder A to increase the temperature, or fluids may be introduced to facilitate other processes, such as agitation, evaporation, &c., of the material under treatment.

It is understood that a cooling or heating medium can be passed through the jacket pipes A to cool or heat the pipes, according to the nature of the liquid or gas passing through the said pipes into the interior of the cylinder, as previously described.

Having thus fully described my invention, I claim as new and desire to secure by Letters Patent—

1. An apparatus for treating ores, comprising a revoluble cylinder, a series of pipes arranged in the wall of such cylinder with their inner faces held exposed, each of the pipes being provided with openings or ports at their exposed points and connected with an air, gas or other supply, all arranged substantially as shown.

2. An apparatus for treating ores, comprising a fixed support, a revoluble cylinder held thereon, a series of pipes arranged at the inner peripheral face of such cylinder, a main gas or air chamber communicating with the said pipes and a cut off held to cover some of the said pipes, held stationary and arranged substantially as shown whereby the said pipes will be successively closed on their upper movement with the cylinder and be opened as they and such cylinder are on a downward movement, all substantially as and for the purposes specified.

3. An apparatus for treating ores, comprising a revoluble cylinder a fire brick lining, a series of jacket pipes held in such lining connected with heating or cooling means and having their inner faces projected through such lining, a series of pipes passed through such jacket pipes connected with an air, gas or other supply, each pipe having discharge ports extended through the exposed portions of the jacket pipes, to permit the air, gas or other fluid to pass into the interior of the cylinder, substantially as shown and for the purposes described.

4. An apparatus for treating ores, comprising a revoluble cylinder, a series of pipes arranged longitudinally therein near the rim thereof, said pipes being connected with an air, gas or liquid supply, having a fixed cut off, arranged to normally close a number of such pipes from the supply, said pipes having valved openings to permit the gas or other fluid to pass into the cylinder, said valves being arranged to close such openings as the pipes are cut off from the air, gas or liquid supply and to be forced open by the pressure of such air, gas or liquid supply, as such pipes are brought into communication with such supply, as set forth.

5. An apparatus for treating ores, comprising a revoluble cylinder having reduced or neck portions at the ends, a fixed ring or support arranged on one of the said neck portions connected with an air, gas or liquid supply, a cut off plate fitted in the upper half of such ring to deflect or lead the gas or fluid to the lower portion of the ring, ports arranged in the neck adapted to be successively brought into communication with the lower end of the ring or air supply space, and a pipe connected with each of the said ports and extending longitudinally through the cylinder at the periphery thereof, each of the said pipes being formed with ports or openings to permit the gas or other fluid to pass into the cylinder, substantially as shown and described.

6. An apparatus for treating ores, comprising a revoluble cylinder formed at its ends with necks, for introducing the material to the cylinder and also the necessary heat for heating the material, a ring arranged on one of the said necks and connected with an air, gas or liquid supply, a cut off plate carried by the said ring and operating over ports formed in the said neck, to permit air, gas or liquid to pass from the ring into the said ports, a pipe connected with each of the said ports and extending longitudinally through the cylinder at the periphery thereof, each of the said pipes being formed with ports or openings to permit the gas or other fluid to pass into the cylinder, and spring-pressed valves held in the said ports or openings, substantially as shown and described.

7. An apparatus for treating ores, comprising a cylinder formed at its ends with necks, for the introduction of the material and heat for heating the material, a ring held on one of the said necks and formed with a chamber connected with a gas or liquid supply, pipes connected with ports in a ring on the said neck, the ring being connected by ports with the said chamber, jacket pipes arranged in the cylinder near the periphery thereof and connected with the said pipes, and a connection between two adjacent jacket pipes, substantially as shown and described.

8. In an apparatus for treating ores, the combination with a supply having ports or openings, of a jacket pipe surrounding the said supply pipe, and forming with the latter two compartments, and elbows held on the ends of the said jacket pipe to connect the two compartments with each other at each end of the jacket pipe, substantially as shown and described.

NORRIS H. CONE.

Witnesses:
H. E. FISKE,
ARTHUR NICHOLS.